: 3,281,390
Patented Oct. 25, 1966

3,281,390
POLYPROPYLENE PLASTICIZED WITH PETROLATUM
John M. O'Leary, Jr., Wilmington, Del., assignor, by mesne assignments, to Container Corporation of America, Chicago, Ill., a corporation of Delaware
No Drawing. Filed Aug. 6, 1963, Ser. No. 300,183
4 Claims. (Cl. 260—33.6)

The present invention is directed to a polypropylene composition and to a method for preparing the same, and more particularly to a polypropylene composition having improved flowability properties, and to a method of preparing such improved composition.

A serious handicap of polypropylene lies in its flow properties. This is true of all grades of polypropylenes including those commercially available for general purpose injection molding and extrusion. Attempts have been made to improve the flow properties of polypropylene, but in the main these attempts have been unsuccessful. Thus, plasticizing agents such as dioctyl phthalate have been incorporated into polypropylene compositions in an attempt to improve the flowability properties, but these conventional plasticizers have not proved satisfactory because they were non-compatible, or would volatilize out of the polypropylene under typical molding conditions encountered in injection molding, extrusion, and the like. In addition, polypropylene compositions have a pronounced tendency to "crock" at low temperatures. Thus, a standard test for crocking is to expose the polypropylene composition to a temperature of 0° C. for twenty-four hours and examine the surface of the polypropylene for exudation. Conventional plasticizing agents having a beneficial effect on the flowability of other polymers tend to exude from the polypropylene in the course of this test.

Plasticizing agents for polypropylene which do not exude from the polypropylene at 0° C. frequently volatilize from it when subjected to oven aging, such as exposure to temperature of 230° C. for one-half hour.

I have conducted extensive investigations to determine if an additive could be introduced into polypropylene that would be both compatible with the polypropylene and serve as a plasticizer for it. Thus, I have investigated a large number of materials suitable for plasticizing other polymers but have found them to be unsatisfactory because they were either non-compatible, or would volatilize out of the polypropylene under typical molding conditions encountered in injection molding, extrusion, blow molding or the like. For example, I have tested dioctyl phthalate, light and heavy lubricating oils, etc. None of these materials have proved satisfactory because of lack of compatibility, volatility, and "crocking" at low temperatures.

This invention has as an object the provision of a novel polypropylene composition having improved flow characteristics.

This invention has as another object the provision of polypropylene compositions possessing high utility for injection molding.

Other objects will appear hereinafter.

I have discovered that about 1 to 20 weight percent of solid petrolatum may be added to polypropylene through the use of a Banbury mixer or other vigorous agitator to yield a composition having both a higher melt index and improved length and swellability properties. A preferred weight percentage range of solid petrolatum in accordance with my invention is about 3 to 12 weight percent of solid petrolatum. I have further discovered that an optimum weight percentage value for the petrolatum is approximately about 5 weight percent, and that compositions containing a greater amount of solid petrolatum than about 15 weight percent tend to lose the improved flowability characteristics conferred by the petrolatum.

Surprisingly, polypropylene compositions of the present invention do not crock when tested for twenty-four hours at 0° C., nor is there any noticeable volatilization as reflected by weight loss when molded rectangular prisms were heated for one-half hour at 230° C. The examination of specimens after the crock test and after the exposure to a temperature of 230° C. failed to reveal any surface exudation, stickiness, or charring.

The present invention is applicable to all of the general purpose injection molding and extrusion grades of polyproylene when have been prepared. For example, a large number of these polypropylene grades are described in the brochure released by the Enjay Chemical Company to accompany its price list of February 1, 1961 entitled "Typical Properties of Injection Molded Escon Polypropylene."

A wide variety of petrolatums may be used in the polypropylene compositions of my invention. In particular, the so-called solid petrolatums confer optimum results. The solid petrolatums, sometimes known as mineral fat or petroleum jelly have a specific gravity of between 0.815 and 0.880 at 60° C. and a melting point in the range of 38° to 60° C. The chief constituents of the solid petrolatums are hydrocarbons of the methane series having between about 16 to about 32 carbon atoms mixed with hydrocarbons of the olefin series having 16 or more carbon atoms. A large number of solid petrolatums are commercially available, some being made by the fractional distillation of still residues from the steam distillation of paraffin-base petroleum, or from steam-reduced amber crude oils (oils from which the light fractions have been removed), and also from the mixing of heavy petroleum lubricating oil with a low melting point paraffin wax. I have used the Protopet, Perfecta, and Fybrene grades of solid petrolatums manufactured by Sonneborn Chemical & Refining Company of New York, N.Y., and solid petrolatum designated "Vaseline" manufactured by Cheseborough-Pond's Inc., New York, N.Y.

In order to illustrate the compositions of the present invention, there is set forth in the following table a comparison of the melt indices, length of extrudate, and percent recovery obtained from polypropylene compositions having 5 weight percent Vaseline, 10 weight percent Vaseline, 15 weight percent Vaseline, and 20 weight percent Vaseline, the Vaseline being incorporated into the polypropylene through mixing by means of a Banbury mixer.

The polypropylene used to form the compositions set forth in the following table was the grade designated Moplen CO–40 sold by Novamont Corp. of New York, N. Y. This is an extrudable grade of polypropylene having an approximate melt index at 230° C. of 4.0. The actual melt index of the batch used in connection with the data set forth in the table at 230° C. under the standard weight of 44 pounds per square inch was 4.157. The length of the extrudate extruded in 10 minutes, designated c./m. in the accompanying table, for this grade was 49.7, and the percent recovery, namely the diameter of the thickest portion of the melt index strand minus the diameter of the orifice used to perform the ASTM melt index test (0.082 inch) divided by the diameter of the orifice used to perform the ASTM melt index test times 100, was 50.6.

A quantitative evaluation of the improved properties of the composition in terms of ability to be used for injection molding, extrusion, blow molding and the like is obtained by a comparison of both the melt index on the one hand, and the length of extrudate and percentage recovery on the other hand. Thus, the melt index reflects the flow characteristics and the length of extrudate and percentage of recovery reflects the nature of the polymer in terms of its plastic memory and flowability. For injection molding a material must have low recovery values and high length values. Otherwise, the material when injection molded will tend to spring out of shape. The relationship of high length values to low percentage recovery values (hence low swellability) possesses comparable significance to the data obtained by Garvey die extrusion testing, wherein measurements are made with Garvey die extrusions to obtain Garvey die ratings.

In order to evaluate the flowability, the following table also sets forth the percentage increase in flowability. This is determined by subtracting the melt index of the Moplen CO–40 (4.157) from the melt index of the composition containing the Vaseline, dividing such value by the melt index of the Moplen CO–40 and multiplying the resultant by 100.

noted that the 20% Vaseline composition possessed a lower melt index than the 15%. Not only was the 15% Vaseline composition superior in terms of melt index, but it possessed the best length of extrudate value of any of the compositions tested, and its percent recovery was lower and hence superior to that of the composition containing 20 weight percent Vaseline. I have determined that the optimum concentration of solid petrolatum in the polypropylene compositions of the present invention is reached at about 3 to 12 weight percent.

Each of the compositions set forth above was injection molded to produce 2″ x 2″ x ⅛″ rectangular prisms. Each of these prisms was tested for crocking at 0° C. for 24 hours and for volatilization and weight loss at 230° C. for one-half hour. Without exception no evidence of crocking, or volatilization was obtained. Thus, the surface of the extruded prisms did not reveal any exudate,

TABLE I

|  | Mop. CO–40 Pellets | CO–40 Mop. 5% Vas. | CO–40 Mop. 10% Vas. | CO–40 Mop. 15% Vas. | CO–40 Mop. 20% Vas. |
|---|---|---|---|---|---|
| Melt Index | 4.16 | 7.143 | 6.35 | 9.633 | 9.016 |
| C./m. | 49.7 | 86.0 | 98.5 | 148.0 | 139.4 |
| Percent R. | 50.6 | 53.1 | 51.8 | 54.3 | 55.5 |
| Percent increase in flowability |  | 71 | 52 | 132 | 117 |

It will be seen from the melt index and percent increase in flowability values that each of the compositions set forth above possess improved flowability when compared with the polypropylene per se. However, it is to be nor in the high temperature testing was there any smoking or stickiness.

The data from Table I reveals the marked improvement and flow. In order to determine the compatibility of the

TABLE II

| Test Performed | ASTM No. | Sample 1 Avg. | Sample 1 Range | Sample 2 Avg. | Sample 2 Range |
|---|---|---|---|---|---|
| Melt Index, Cond. L, 230° C./2,160 g. load (g./10 min.) | D1238–62T | 3.9 |  | 3.6 |  |
| Tensile Characteristics 0.5″/min | D1708–59T |  |  |  |  |
| Yield Strength (p.s.i.) |  | 5,040 | 4,949–5,160 | 5,030 | 4,980–5,050 |
| Breaking Strength (p.s.i.) |  | 6,920 | 6,900–6,930 | 7,090 | 6,730–7,350 |
| Elongation at Break (percent) |  | 630 | 620–640 | 640 | 600–670 |
| Izod Impact Strength, Method A (ft.-lb./in. notch) | D256–56 | 0.32 | 0.27–0.36 | 0.31 | 0.29–0.35 |
| Flexural Modulus of Elasticity (p.s.i.) | D790–61 | 210,000 | 208,000–212,000 |  |  |
| Hardness, Durometer D: |  |  |  |  |  |
| Initial Reading | D1706–61 | 73 | 72–74 |  |  |
| 10-Second Reading |  | 70 | 69–71 |  |  |
| Deflection Temperature 66 p.s.i., ⅛″ Bar (° C.) | D648–56 | 119 | 118–120 |  |  |
| Vicat Softening Point (° C.) | D1525–58T | 151 |  |  |  |
| Brittle Temperature (° C.) | D746–57T | +47 |  |  |  |
| Dielectric Constant, 1 kilocycle | D150–59T | 2.18 |  |  |  |
| Dissipation Factor, 1 kilocycle | D150–59T | 0.0002 |  |  |  |
| Ultraviolet Exposure, 120 hours, RS–4 Sun Lamp | D620–57T, Modified | (1) | (1) | (1) | (1) |
| Subnormal Temp. Exposure, –26° C./120 hours |  | (2) | (2) | (2) | (2) |
| Short-Shot Molding Pressure |  | 1,730 |  | 1,330 |  |

| Test Performed | ASTM No. | Sample 3 Avg. | Sample 3 Range | Sample 4 Avg. | Sample 4 Range |
|---|---|---|---|---|---|
| Melt Index, Cond. L, 230° C./2,160 g. load (g./10 min.) | D1238–62T | 5.3 |  | 8.6 |  |
| Tensile Characteristics 0.5″/min | D1708–59T |  |  |  |  |
| Yield strength (p.s.i.) |  | 4,130 | 4,080–4,200 | 3,880 | 3,870–3,930 |
| Breaking Strength (p.s.i.) |  | 6,570 | 6,520–6,650 | 6,020 | 5,920–6,140 |
| Elongation at Break (percent) |  | 740 | 720–760 | 670 | 660–680 |
| Izod Impact Strength Method A (ft.-lb./in. notch) | D256–56 | 0.36 | 0.31–0.43 | 0.30 | 0.25–0.38 |
| Flexural Modulus of Elasticity (p.s.i.) | D790–61 | 148,000 | 147,000–148,000 | 113,000 | 112,000–114,000 |
| Hardness, Durometer D: |  |  |  |  |  |
| Initial Reading | D1706–61 | 68 | 67–70 | 66 | 65–68 |
| 10-Second Reading |  | 67 | 65–68 | 63 | 62–65 |
| Deflection Temperature 66 p.s.i., ⅛″ Bar (° C.) | D648–56 | 108 | 106–109 | 105 | 104–105 |
| Vicat Softening Point (° C.) | D1525–58T | 148 |  | 143 |  |
| Brittle Temperature, (° C.) | D746–57T | +17 |  | +15 |  |
| Dielectric Constant, 1 kilocycle | D150–59T | 2.20 |  | 2.19 |  |
| Dissipation Factor, 1 kilocycle | D150–59T | 0.0002 |  | 0.0002 |  |
| Ultraviolet Exposure, 120 hours, RS–4 Sun Lamp | D620–57T, Modified | (3) | (3) | (4) | (4) |
| Subnormal Temp. Exposure –26° C./120 hours |  | (2) | (2) | (2) | (2) |
| Short-Shot Molding Pressure |  | 1,450 |  | 1,360 |  |

[1] Slight change, faint yellowing.
[2] No change.
[3] Slight change, yellowing.
[4] Appreciable change, yellowing.

solid petrolatum with polypropylene, the following four samples were prepared:

Sample 1 was Moplen CO-40, as received from Novamont Corp. of New York, N.Y.

Sample 2 was Moplen CO-40 which had been subjected to agitation in a Banbury mixer.

Sample 3 was Moplen CO-40 containing 5 weight percent of Vaseline which had been incorporated into the polypropylene by agitation with a Banbury mixer.

Sample 4 was Moplen CO-40 containing 15 weight percent of Vaseline which had been incorporated into the polypropylene by agitation with a Banbury mixer.

Infra red scans were made on each of the samples using a Bosch & Lomb Spectronic 505. This apparatus plotted the absorbence versus wavelength in microns over a wavelength range of 2.5 to 15. The test specimens used for the measurements were compression-molded thin films pressed at approximately 345° F. and having a thickness of about 2.5 to 3.0 thousandths of an inch.

The plots of the infra red scans showed conclusively that there was no difference between any of the four samples, namely between the Moplen CO-40 (whether in its original state or after being subjected to a Banbury mixer), and the compositions containing the 5 weight percent and 15 weight percent Vaseline. This indicates not only the complete compatibility of the solid petrolatum with the polypropylene, but also indicates the formation of a chemical union wherein the solid petrolatum loses its chemical identity.

In order to determine whether the physical properties of the polypropylene were changed, the four samples referred to above were subjected to the tests set forth in Table II.

In connection with the aforesaid Table II, the samples were subjected to injection molding procedures in order to obtain the specimens needed for ASTM D1708-59T. These were secured on a Plasticor Junior with a cylinder capacity of approximately ¼ ounce. This machine was hand operated and was fitted with a cylinder that was insulated and temperature controlled by a compensating and indicating controller. A single-cavity mold was used which produced a test specimen conforming to the ASTM specification D1708-59T, FIG. 1—Microtensile Test Specimen. The molding cycle was critically controlled, and the material was weighed between each cycle. The following molding conditions were used:

| | |
|---|---|
| Cylinder temperature, ° F. | 460+5 |
| Mold temperature, ° F. | 80±10 |
| Injection pressure, p.s.i. | 2180 |
| Total cycle, seconds | 60 |
| Injection and dwell time, seconds | 15 |
| Charging and dead time, seconds | 40 |
| Mold open time, seconds | 5 |
| Clamping pressure, p.s.i.g. (1000 lbs.) | 80 |

Ten to fifteen microtensile test specimens were prepared by the above conditions from each material and tested for tensile characteristics.

After the above tensile specimens were obtained, pressure was released in steps to obtain the short-shot molding range. From two to four lower pressures were used for each material to determine what range was necessary to give partial filling of the mold cavity, and from this information and the weight of the "short" specimens, it was possible to calculate the pressure at which the mold cavity would barely fill. This pressure is described as the "short-shot" of these materials under the above molding conditions and establishes a relative value of flowability.

Compression molding tests were made under strictly controlled procedures. Thus, two plates 6" x 6" x .057" and one plate 5" x 5" x 0.125" were molded from each of the four samples. The molds employed were steel, having a picture-frame configuration with a 1" land. Polished retaining plates 0.02" thick of chrome-plated steel were used on each side of the mold frame to reproduce a glossy surface on the resultant molding. The mold frame was placed on one of these high-gloss plates, a charge in excess of that necesssary to completely fill the mold was used, and this was deposited carefully at the center of the mold frame. A second polished plate was placed on top of the charge and the whole assembly inserted into a hot press having parallel platens maintained at a temperature of 420±5° F. The press was then closed to contact the top plate and held in this preheating position for 1½ minutes. Then a load of 31,000 pounds was applied to the molding assembly for an additional time of 2½ minutes. The pressure was then released, the mold assembly moved quickly from the hot press, inserted immediately into another press maintained at a temperature of 70° F., and immediately pressurized to 31,000 pounds. The mold assembly was then cool enough to remove after one minute under these conditions. The resulting moldings were bubble-free, of high gloss, and showed shrink marks only on the outer edges.

The test procedures set forth in TABLE II were performed in a standard laboratory environment of 50±2% relative humidity and 73±2° F. Unless otherwise specified, ASTM test procedures were adhered to.

Melt Index

Melt index was determined according to ASTM D1238-62T, entitled Method of Measuring Flow Rates of Thermoplastics by Extrusion Plastometer. Condition L was employed, which specified 230° C. and a 216 g. load. For the flow range obtained for these materials, the specified 6 g. charge was used. Single determinations were made for each material, with check tests performed directly after collection of the required extrudate to verify the values obtained.

Tensile characteristics

Tensile characteristics were determined according to ASTM D1708-59T, entitled Tensile Properties of Plastics by Use of Microtensile Specimens. An Instron tester was utilized for this tests, with three determinations made for each material. The injection-molded microtensile specimens were use with a clamp separation of 0.9 inch and crosshead speed of 0.5"/min. Yield strength, breaking strength, and percent elongation at break were determined. The test specimens were exposed to the standard laboratory conditions for 48 hours prior to testing.

Izod Impact strength

Izod impact strength tests were performed on samples cut and machined from a compression-molded ⅛" plate according to ASTM D256-56, entitled Test for Impact Resistance of Plastics and Electrical Insulating Materials. Notching was performed on a four-tooth milling cutter having the required radius at the tip of the cutting teeth. Six determinations for Izod impact strength were made on each material. A Baldwin type impact tester with a capacity of 0 to 2 ft.-lbs. was used. Test specimens were conditioned slightly over 40 hours at standard laboratory conditions prior to testing.

Flexural modulus of elasticity

Flexural modulus of elasticity was performed according to ASTM D790-61, entitled Flexural Properties of Plastics. Test specimsnts were bars 3" x ½" x ⅛", cut and machined from a ⅛" thick plate. Only Samples No. 1, No. 3, and No. 4 were tested for this property. A span-depth ratio of 16:1 was maintained, with a deflection rate of 0.05 in./min. The Instron tester was used, which reproduced a load deflection curve from which modulus calculations were made. Two determinations were made for each of the above materials. Speciments were conditioned at standard laboratory conditions for a period of 48 hours prior to testing.

Durometer D hardness

Durometer D hardness determinations were made on Samples No. 1, No. 3, and No. 4 according to procedures of ASTM D1706–61, entitled Test for Indentation Hardness of Plastics by Means of a Durometer, using both the initial reading and the decayed reading after 10 seconds. Samples used for this testing were the ends of the flexural modulus bars. Five determinations for hardness were made on each of these materials.

*Brittle temperature*

Brittle temperature was determined according to ASTM D746–57T, entitled Test for Brittleness Temperature of Plastics and Elastomers by Impact. Specimens were 1¼" x ¼" x .057", cut from the compression-molded 0.057" plate. A pendulum type impact test unit was used with a methanol-Dry Ice bath for the temperature conditioning medium. The 50% failure temperature was determined for each of Samples No. 1, No. 3, and No. 4. The 50% failure temperature was determined by plotting the number of breaks out of ten specimens for at least three different temperatures on probability graph paper. No special conditioning was performed on these specimens prior to testing.

*Vicat softening point*

Vicat softening point for Samples No. 1, No. 3, and No. 4 were determined according to ASTM D1525–58T, entitled Vicat Softening Point of Plastics. Test specimens were ¾" x ¾" x ⅛", cut from the ⅛" compression-molded plate. One determination on each material was made. Specimens were conditioned according to D618–61, entitled Methods of Conditioning Plastics and Electrical Insulating Materials for Testing, Procedure B—Condition 48/50 plus DES.—48 hours in a circulating-air oven at a temperature of 50±2° C., followed by a minimum of 5 hours' desiccation at room temperature.

*Deflection temperature*

Deflection temperature was determined on Samples No. 1, No. 3, and No. 4 according to ASTM D648–56, entitled Deflection Temperature of Plastics Under Load. Two determinations were made for each of the above materials and were 5" x ½" x ⅛" bars, cut and machined from the compression-molded ⅛" plate. Mineral oil was used as the heat transfer medium, with an average rate of increase in temperature of 2±.2 degrees C./min. These test specimens were conditioned according to ASTM D618, Procedure B, prior to testing.

*Dielectric constant and dissipation factor*

Dielectric constant and dissipation factor were determined according to ASTM D150–59T, entitled Test for A.-C. Capacitance, Dielectric Constant, and Loss Characteristic of Electrical Insulating Materials. The test specimen used was a 2" diameter disk cut from the ⅛" compression-molded plate. A 1-kilocycle frequency was used on a General Radio test bridge, with thin aluminum foil electrodes adhered to each face of the test specimen, with a thin coating of Vaseline. The General Radio Type 1690–A dielectric sample holder was utilized for these measurements.

*Ultraviolet sunlamp exposure*

Exposure to U.V. was performed under an RS–4 Sunlamp, following the essential procedures outlined in ASTM D620–57T, entitled Test for Color Fastness of Plastics to Light. This particular test specified an S–1 bulb, but I have modified the apparatus by replacing the S–1 bulb with an RS–4 bulb. The latter gives the same U.V. output range but has a significantly higher wattage intensity to accelerate the effect of this particular U.V. aging. Injection-molded test specimens with the gate and sprue attached were exposed under this sunlamp for a period of 120 hours. This exposure roughly approximates one year's exposure under outdoor conditions facing south 45 degrees. Specimens of each material were evaluated for color change.

*Subnormal temperature exposure*

One tensile specimen with the gate and sprue attached of each material was exposed at an air environment of —26° F. for a period of 120 hours and then evaluated for any visible change.

It will be seen from the foregoing that the incorporation of the solid petrolatum in the amount shown with the polypropylene does not seriously affect the polypropylene's physical properties. In fact, the Brittle Temperature is improved by some 30° C.

Another batch of Moplen CO–40 was used to determine the effect of the addition of petrolatum in polypropylene compositions containing additives such as asbestos or elastomers, such as polyisobutylene. These materials drastically adversely affect the flow properties of polypropylene, and it was of utmost interest to ascertain whether the presence of the petrolatum would beneficially affect the flow properties.

Furthermore, in order to determine the utility of the compositions of the present invention in processing methods involving great changes in shear, such as injection molding, data was secured using three times the standard weight and ten times the standard weight of the ASTM melt index test (ASTM D1238–62T).

The values for the Moplen CO–40 were taken before the same was subjected to a Banbury mixer and subsequent to a Banbury mixture (namely after the same had been subjected to mixing in a Banbury mixer). Then mixtures of the Moplen CO–40 were prepared using a Banbury mixer to achieve the uniform mixture with 15 weight percent polyisobutylene;[1] a mixture containing 15 weight percent of the polyisobutylene plus 8 weight percent of Vaseline; a mixture of the polypropylene plus 40 weight percent of asbestos fibers; and a mixture of the polypropylene plus 40 weight percent of the asbestos fibers and 12 weight percent of Vaseline. The results are shown in Table III.

[1] Vistanex L100 made by Enjay Chemical Company, New York, N.Y., described in their Price List No. 9 dated April 15, 1961.

TABLE III

|  | CO–40 Mop. | CO–40 Mop. Ban. Mxd. | CO–40 Mop. 15% PIB | CO–40 Mop. 8%, Vas. 15% PIB | CO–40 Mop. 40% Asb. | CO–40 Mop. 12%, Vas. 40% Asb. |
|---|---|---|---|---|---|---|
| Melt Index | 3.83 | 4.17 | 3.04 | 3.85 | 2.32 | 6.61 |
| Length, c./m | 47.5 | 56.0 | 44.5 | 42.8 | 21.0 | 100.5 |
| Percent Recovery | 47.0 | 44.5 | 19.1 | 23.9 | 2.1 | 4.5 |
| Percent Increase in Flow | Base | 8.9 | −20.7 | (¹) | −40.0 | 72.5 |
| 3X Weight: |  |  |  |  |  |  |
| Melt Index | 30.108 | 29.97 | 23.37 | 24.5 | 23.26 | 64.9 |
| Length, c./m | 130.0 | 90.0 | 128.0 | 145.0 | 169.0 | 170.5 |
| Percent Recovery | 92.0 | 62.0 | 43.3 | 55.0 | 10.6 | 5.7 |
| 10X Weight: |  |  |  |  |  |  |
| Melt Index | 302.5 | 286.2 | 207.04 | 277.97 | 208.2 | 290.46 |
| Length, c./m | 20.0 | 23.0 | 22.0 | 23.0 | 57.0 | 52.0 |
| Percent Recovery | 295 | 155.2 | 124.8 | 130.9 | 48.2 | 62.8 |

¹ Same as Base.

It will be seen from the foregoing that both the polyisobutylene and the asbestos drastically reduce the rate of flow. However, the addition of the Vaseline restored the flow rate to the polysiobutylene composition and drastically increased the flow rate in the asbestos composition.

In respect to the test performed under three times and ten times the standard weight load, it will be seen that the compositions containing the Vaseline had higher length values (with the exception of the ten times standard weight composition involving the 40 percent asbestos) than the comparable composition not having the Vaseline, and had appreciably lower percent recovery values than the original Moplen CO-40. This indicates that the compositions of the present invention have utility for use in injection molding, and other processes involving high shear.

From the above data, and from numerous other tests which I have performed, I have determined that the polypropylene compositions of the present invention should comprise at least 45 weight percent polypropylene, and at least one to twenty weight percent of petrolatum. The remainder may comprise the widest possible variety of materials, such as may be added to polypropylene including conventional antioxidants and inhibitors, asbestos fibers, elastomers such as polybutylene, and polyisobutylene, coloring agents, etc.

In compositions consisting essentially of polypropylene and the petrolatum, such compositions should consist essentially of the uniform mixture of 99 to 80 weight percent of polypropylene, and from one to twenty weight percent of petrolatum.

I have determined that the preferred weight percentage range for the petrolatum is between 3 and 12 weight percent, with the optimum value generally being, as previously indicated, about 5 weight percent.

My invention has great commercial significance because it enhances the processability of the polypropylene composition without significantly affecting the physical properties of the polypropylene. This enables larger molds for housewares and appliances to be secured, which molds have a lower residual stress and greater toughness. Furthermore, larger amounts of fillers and/or elastomers may be incorporated into the compositions of the present invention than are normally used, with the retention of good processing properties. This would enable the more facile production of higher quality pipes, ducts, and blow molded articles.

My invention has important commercial significance in the field of wire coating, where the easier extrusion which can be used with my invention produces less strain in the coating. This permits higher rates of extrusion of wire coatings without adversely affecting the electrical properties of the coating.

The improved brittle temperature properties of the compositions of my invention enhance the utility of my compositions for uses in the manufacture of articles which are subjected to temperature extremes, such as automotive accessories, buttons, etc.

The present invention may be embodied in other specific forms without departing from the spirit or essential attributes thereof, and, accordingly, reference should be made to the appended claims, rather than to the foregoing specification as indicating the scope of the invention.

I claim:

1. A composition comprising a uniform mixture of more than 45 weight percent of solid polypropylene, and from 1 to 20 weight percent of solid petrolatum.

2. A composition in accordance with claim 1 in which from 3 to 12 weight percent of petrolatum is present.

3. A composition consisting essentially of about from 99 to 80 weight percent of solid polypropylene, and from 1 to 20 weight percent of solid petrolatum.

4. A composition in accordance with claim 3 in which from 3 to 12 weight percent of petrolatum is present.

References Cited by the Examiner

UNITED STATES PATENTS

| | | | |
|---|---|---|---|
| 2,217,918 | 10/1940 | Rostler | 260—759 X |
| 2,891,016 | 6/1959 | Kern et al. | 260—33.6 |
| 3,010,916 | 11/1961 | Pooley | 260—33.6 |
| 3,012,016 | 12/1961 | Kirk et al. | 260—93.7 X |
| 3,012,020 | 12/1961 | Kirk et al. | 260—93.7 X |
| 3,037,949 | 6/1962 | Bonvicini | 260—45.5 X |
| 3,037,954 | 6/1962 | Gessler et al. | 260—45.5 X |

FOREIGN PATENTS

| | | |
|---|---|---|
| 563,347 | 6/1958 | Belgium. |
| 881,507 | 11/1961 | Great Britain. |

OTHER REFERENCES

Raff et al., Polyethylene, High Polymers, vol. XI, Interscience Publishers, Inc., New York, 1956, pages 156 and 308.

MORRIS LIEBMAN, *Primary Examiner.*

ALEXANDER H. BRODMERKEL, *Examiner.*

D. W. ERICKSON, J. S. WALDRON,
*Assistant Examiners.*